United States Patent [19]

Headley et al.

[11] Patent Number: 5,662,352
[45] Date of Patent: Sep. 2, 1997

[54] SWAGED ANNULAR SUPPORT FOR AIR BAG INFLATOR CLOSURE AND METHOD

[75] Inventors: Paul S. Headley, Mesa; Mitchell P. Zakula, Tempe; Tom Amherdt, Gilbert, all of Ariz.

[73] Assignee: TRW Inc., Lyndhurst, Ohio

[21] Appl. No.: 536,201

[22] Filed: Sep. 27, 1995

[51] Int. Cl.$^6$ .................................................. B60R 21/26
[52] U.S. Cl. ................ 280/737; 137/68.13; 137/68.19; 222/3; 29/522.1
[58] Field of Search .................................. 280/737, 736, 280/740, 741, 742; 137/68.13, 68.19, 68.21, 68.23, 68.25, 68.28; 222/3; 29/522.1, 523, 525.05

[56] References Cited

U.S. PATENT DOCUMENTS

| | | | |
|---|---|---|---|
| 2,319,546 | 5/1943 | Insley et al. | 29/522.1 |
| 2,752,693 | 7/1956 | Wullschleger | 29/522.1 |
| 2,766,904 | 10/1956 | Philip | 137/68.25 |
| 3,648,897 | 3/1972 | Ranft | 280/737 |
| 3,777,772 | 12/1973 | Arnold et al. | 280/737 |
| 3,810,655 | 5/1974 | Pracher | 280/736 |
| 3,817,263 | 6/1974 | Bendler et al. | 280/736 |
| 3,909,920 | 10/1975 | Cornish et al. | 29/522.1 |
| 3,913,604 | 10/1975 | Hanson et al. | 137/68.13 |
| 4,553,559 | 11/1985 | Short, III | 137/68.25 |
| 5,022,674 | 6/1991 | Frantom et al. | 280/737 |
| 5,290,060 | 3/1994 | Smith | 280/737 |
| 5,388,322 | 2/1995 | Simon | 280/737 |
| 5,468,015 | 11/1995 | Goetz | 280/737 |

*Primary Examiner*—Brian L. Johnson
*Assistant Examiner*—Peter C. English
*Attorney, Agent, or Firm*—Tarolli, Sundheim, Covell, Tummino & Szabo

[57] ABSTRACT

An apparatus (24) for inflating an inflatable vehicle occupant protection device (22) comprises a container (40) which provides a source of inflation fluid. The container (40) has an opening (44) through which the fluid can flow to inflate the protection device (22). A support surface (84) is located adjacent the opening (44). A cavity (120) is located adjacent the support surface. A rupturable closure (100) extends across the opening (44) to block the flow of fluid through the opening. A weld (108) forms a fluid seal between the closure (100) and the support surface (84). A member (140) is located in the cavity (120) and has a first portion (144) engaging a surface defining the cavity to secure the member to the container (40). A second portion (142) of the member (140) engages the closure (100) to hold the closure against the support surface (84) of the container (40). The member (140) has an opening (146) through which fluid can flow when the closure (100) is ruptured. An actuatable igniter (160), upon actuation, ruptures the closure (100).

7 Claims, 4 Drawing Sheets

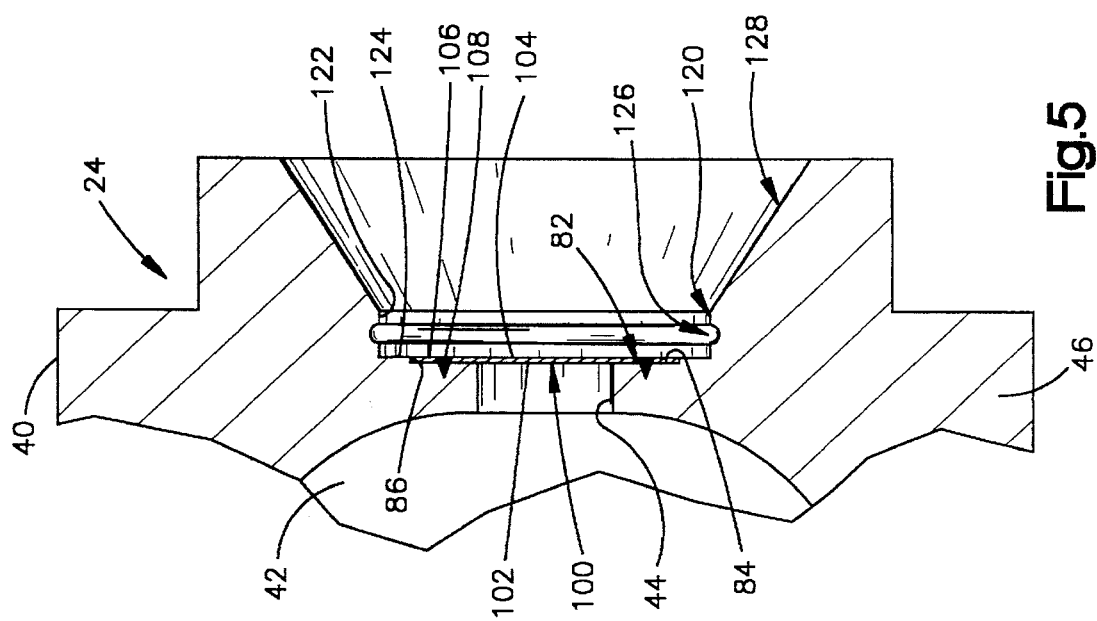
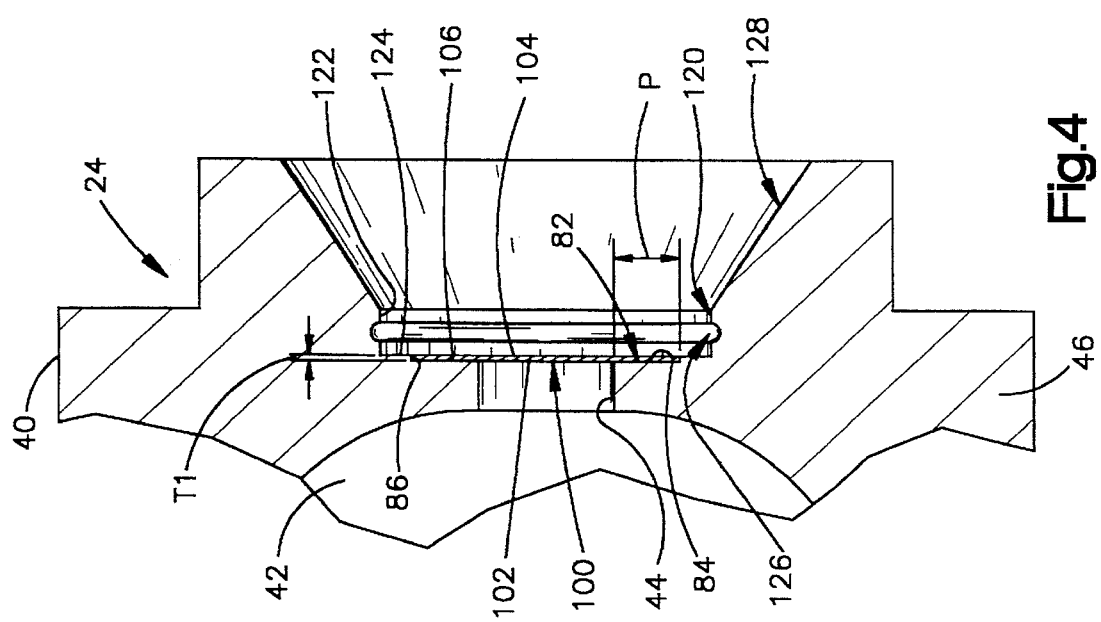

SWAGED ANNULAR SUPPORT FOR AIR BAG INFLATOR CLOSURE AND METHOD

BACKGROUND OF THE INVENTION

1. Technical Field

The present invention relates to an inflatable vehicle occupant protection device, and particularly to an inflator which provides inflation fluid for inflating the protection device and to a method of assembling the inflator.

2. Description of the Prior Art

Inflators which provide inflation fluid for inflating inflatable vehicle occupant protection devices, such as air bags, are known. One type of air bag inflator includes a container which holds an inflation fluid under pressure. The container has an opening through which the inflation fluid can flow to inflate an air bag. A rupturable closure is welded to the container and extends across the opening to block fluid flow through the opening. The weld is continuous and forms a fluid seal around the opening.

The weld not only forms a seal but bears the load of the pressure of the inflation fluid acting on the closure. In one type of inflator, the pressure in the container is increased by various known ways to rupture the closure and start the flow of inflation fluid. The pressure at which the closure ruptures could vary considerably from one inflator to another. This variation in pressure required to rupture the closure can be attributed to, among other factors, a variation in the strength of a "heat affected area" of the closure. The heat affected area is an area of the closure heated during the welding operation. The heat affected area is located adjacent the weld. The heat affected area of the closure may be weaker than other areas of the closure, and thus the heat affected area may rupture first to start the flow of inflation fluid through the opening in the container. The size and strength of the heat affected area varies due to a variation in the amount of heat applied to the closure during the welding operation.

If the container is one-piece, the closure is typically welded to an exterior surface of the container. Pressure of the inflation fluid in the container could act directly on the heat affected area to rupture the closure at the heat affected area. If the closure is supported by an interior surface of the container, the heat affected area is at least partially supported by a surface of the container surrounding the opening. This may permit the closure to rupture in a more consistent manner. However, such a container is typically made of at least two pieces and requires additional operations and cost to manufacture and assemble.

SUMMARY OF THE INVENTION

The present invention is directed to an apparatus which provides an inflation fluid for inflating an inflatable vehicle occupant protection device, such as an air bag, and to a method for assembling the apparatus. The apparatus comprises a container providing a source of inflation fluid. The container has an opening through which inflation fluid can flow to inflate the occupant protection device. The container also has surfaces which define a cavity located adjacent the opening. A rupturable closure is positioned to extend across the opening to block the flow of fluid through the opening. Means for holding the closure in the position across the opening comprises a member which is located in the cavity and which has an opening through which inflation fluid can flow when the closure is ruptured. The member has a first portion engaging the closure. A second portion of the member engages surfaces defining at least a portion of the cavity to hold the first portion in engagement with the closure and to hold the closure in the position blocking the flow of inflation fluid through the opening in the container. The member also bears the load of the pressure of the inflation fluid acting on the closure.

The apparatus further includes a seal located between the closure and the container. The seal is a weld that extends around and is spaced from the opening in the container. The closure may have a heat affected area caused by heat applied to the closure during a welding operation.

The flow area of the opening in the member is substantially the same as the flow area of the opening in the container. The openings are aligned so the member spans and supports the heat affected area of the closure to assure that the pressure of the inflation fluid acts on the closure at a location other than at the heat affected area.

The surfaces defining the cavity include an inner cylindrical surface. A surface defining a channel extends outward from the inner cylindrical surface. The second portion of the member is deformed into engagement with the cylindrical surface and into the channel.

A support surface partially defines a recess located between the opening in the container and the cavity. The rupturable closure is located in the recess. The member engages a first major side surface of the closure to hold a second major side surface of the closure against the support surface of the recess. The apparatus also includes an actuatable igniter located outside of the chamber and which, upon actuation, effects rupturing of the closure.

The method of the present invention comprises the steps of providing a container including a source of inflation fluid. The container has an opening through which the inflation fluid can flow to inflate the occupant protection device. The container has a recess defined in part by a support surface. The recess is located adjacent the opening. A cavity is located adjacent the recess. A channel extends from the cavity. A rupturable closure is positioned in the recess and extends across the opening. A member made of a deformable material is positioned in the cavity adjacent the closure. The member has an opening through which fluid can flow when the closure is ruptured. A portion of the member is deformed into engagement with the cavity and into the channel to hold the member in position relative to the container. The closure is held against the support surface of the recess by the member to block the flow of inflation fluid through the opening in the container.

The deforming step includes the step of deforming the portion of the member radially outward into engagement with surfaces defining the cavity and the channel. The method also includes sealing between the closure and the container at a location around the opening. The method further includes the step of filling the container with an inflation fluid. The filling step is performed after the member is deformed into engagement with the surfaces defining the cavity and into the channel.

BRIEF DESCRIPTION OF THE DRAWINGS

Further features and advantages of the present invention will become apparent to those skilled in the art to which the present invention relates from reading the following specification with reference to the accompanying drawings, in which:

FIGS. 3–7 are enlarged views of the end portion of the inflator of FIG. 2, illustrating steps of assembling the end portion of the inflator.

DESCRIPTION OF A PREFERRED EMBODIMENT

Figure 1:
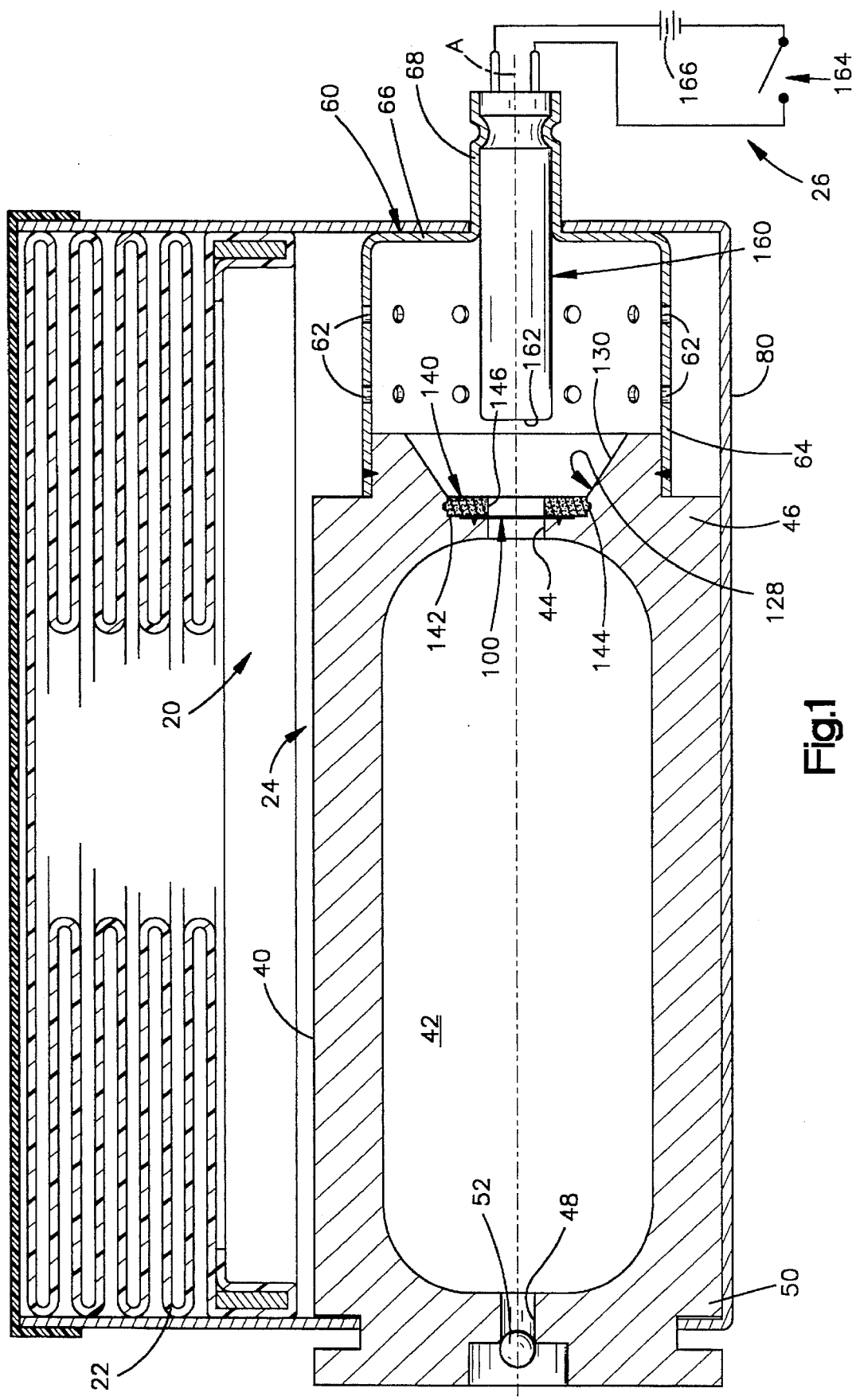
FIG. 1 is a schematic sectional view of an air bag inflator embodying the present invention.

An inflatable vehicle occupant protection system 20 is illustrated in FIG. 1. The protection system 20 includes a particular type of inflatable vehicle occupant protection device known as an air bag 22 which is inflatable from an initial stored condition. The protection system 20 also includes an actuatable inflator 24 which, upon actuation, provides inflation fluid to inflate the air bag 22. The protection system 20 further includes an electrical circuit 26 which is electrically connected with the inflator 24. The circuit 26 includes a sensor which is operably connected with the inflator 24 and which closes to actuate the inflator 24 to initiate inflation of the air bag 22.

The inflator 24 includes a container 40. The container 40 is cylindrical and has a longitudinal central axis A. The container 40 is one piece and is made from a metal, such as steel or aluminum. The container 40 could also be made from a fiber reinforced plastic material.

The container 40 defines a chamber 42 for receiving and holding inflation fluid. Preferably, the container 40 stores inflation fluid under pressure. The inflation fluid is preferably an inert gas, such as argon or nitrogen, or a mixture of inert gases. The inflation fluid is stored in the chamber 42 of the container 40 at a pressure of at least about 2,000 psi, and preferably in the range of approximately 4,000 psi to approximately 6,000 psi.

An opening 44 extends through a right end portion 46 of the container 40, as viewed in FIG. 1. The opening 44 is cylindrical and has a center which is located along the axis A of the container 40. The opening 44 has a diameter D1 (FIG. 3), measured in a direction normal to the axis A. The inflation fluid flows from the chamber 42 through the opening 44 in the container 40 to inflate the air bag 22. A fill port 48 is located in a left end portion 50 of the container 40, as viewed in FIG. 1. The fill port 48 is sealed by a spherical member 52 welded to the left end 50 of the container 40.

Figure 2:
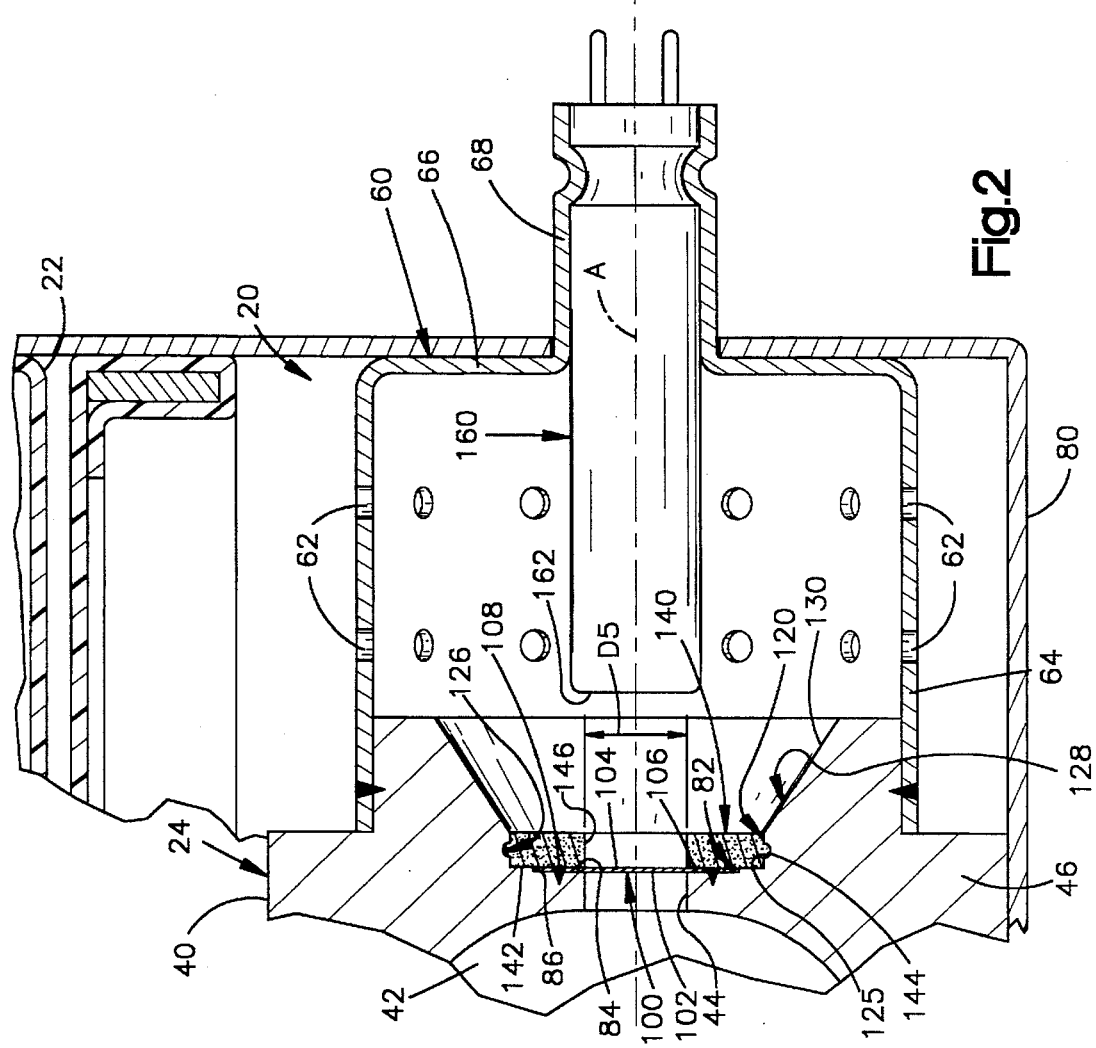
FIG. 2 is an enlarged view of an end portion of the inflator of FIG. 1.

A diffuser 60 surrounds a part of the right end portion 46 of the container 40 so any inflation fluid exiting the opening 44 enters the diffuser. A tubular main portion 64 of the diffuser 60 is welded to the right end portion 46 of the container 40, as viewed in FIGS. 1 and 2. A plurality of diffuser openings 62 are located in the tubular main portion 64 of the diffuser 60. The openings 62 direct the flow of inflation fluid radially outward relative to the axis A. An end wall 66 of the diffuser 60 extends radially inward from the tubular main portion 64. A tubular mounting 68 of the diffuser 60 extends axially along the axis A from the end wall 66 in a direction opposite to the tubular main portion 64.

A reaction canister 80 supports the container 40, the diffuser 60 and the air bag 22. The reaction canister 80 surrounds a lower portion of the diffuser 60, as viewed in FIGS. 1 and 2. The reaction canister 80 deflects the inflation fluid which exits the lower portion of the diffuser 60, as viewed in FIGS. 1 and 2, toward the air bag 22. The inflation fluid which exits the upper portion of the diffuser 60, as viewed in FIG. 2, flows directly into the air bag 22.

An annular recess 82 (best seen in FIG. 3) is formed in the right end portion 46 of the container 40. The recess 82 is located adjacent the opening 44. The recess 82 is defined in part by a radially extending support surface 84 which surrounds the opening 44 and an inner cylindrical surface 86. The recess 82 has a depth DE, measured in a direction along the axis A. The recess 82 also has a diameter D2, measured in a direction normal to the axis A, which is greater than the diameter D1 of the opening 44.

A rupturable closure 100 (FIG. 2) is located in the recess 82. The closure 100 is preferably made from a relatively thin metal that is compatible for welding to the material of the container 40, such as steel for a steel container or aluminum for an aluminum container. The closure 100 is impermeable to the inflation fluid. The closure 100 has a pair of parallel major side surfaces 102, 104 which face in opposite directions. The closure 100 has a thickness T1 (FIG. 4), defined as the distance between the major side surfaces 102, 104. The thickness T1 of the closure 100 is substantially equal to the depth DE of the recess 82.

The closure 100 has an annular portion 106 which engages the support surface 84 of the recess 82 over a radially extending distance P (FIG. 4). The annular portion 106 of the closure 100 is secured by a weld 108 to the support surface 84 (FIGS. 2 and 3) of the recess 82. The container 40, closure 100 and weld 108 cooperate to define and close the chamber 42.

The weld 108 (FIGS. 2 and 5) extends continuously around the annular portion 106 of the closure 100 to seal the opening 44 in the container 40. The weld 108 serves primarily as a seal to prevent leakage of the inflation fluid from the chamber 42. The weld 108 is not intended to absorb or withstand the majority of the force resulting from the pressure of the inflation fluid in the chamber 42 which acts on the closure 100.

A heat affected area of the closure 100 is located adjacent the weld 108 and results from heating an area of the closure during the welding operation. There may be any number of heat affected areas of the closure 100. Any or all of the heat affected areas may be the portion of the closure 100 most prone to rupture. The heat affected areas of the closure 100 are located radially outward of the opening 44 in the container 40 and within the radially extending dimension P of the support surface 84.

A retention cavity 120 (FIG. 3) is formed in the right end portion 46 of the container 40. The cavity 120 is located adjacent to the recess 82 on a side of the recess opposite the opening 44. The cavity 120 is centered on the axis A and surrounds the recess 82 and the opening 44. The cavity 120 is defined by an inner cylindrical surface 122 and a radially extending end surface 124. The cavity 120 has a diameter D3, measured in a direction normal to the axis A, which is greater than the diameter D2 of the recess 82.

The cavity 120 is also defined by a surface 125 that defines an annular retention channel 126. The channel 126 is continuous and extends radially outward from the inner cylindrical surface 122. The channel 126 has a maximum diameter D4, measured in a direction normal to the axis A. The diameter D4 of the channel 126 is greater than the diameter D3 of the cavity 120. The channel 126 is located substantially at the middle of the length L (FIG. 3) of the cavity 120, measured in a direction parallel to the axis A. The cavity 120 thus has a substantially constant shape and dimension in a plane extending radially from the axis A of the container 40 and around the axis. It will be apparent that the channel 126 does not have to be continuous and annular. For example, the channel 126 could comprise a plurality of relatively short and discontinuous pockets located around the inner cylindrical surface 122 and having discrete chordal or arcuate lengths.

An alignment chamber 128 is located adjacent the cavity 120 along the axis A. The alignment chamber 128 is located on a side of the cavity 120 opposite the recess 82. An angled surface 130 of the container 40 angles outward relative to the axis A from left to right, as viewed in FIG. 2, to define the chamber 128 and give it a frustoconical shape.

An annular support member 140 (FIGS. 1 and 2) is located in the cavity 120 and is secured to the container 40. A left end surface 142 (FIG. 2) of the support member 140 engages the major side surface 104 of the closure 100 and the end surface 124 of the cavity 120. The end surface 142 of the support member 140 thus holds the major side surface 102 of the closure 100 against the support surface 84 of the recess 82. The support member 140 also holds the closure 100 in a position to block the flow of inflation fluid through the opening 44 in the container 40. The support member 140 bears the majority of the force resulting from the pressure of the inflation fluid in the chamber 42 acting on the closure 100. This force attempts to tear the closure 100 from the weld 108 and move the closure 100 in a direction away from the support surface 84 of the recess 82.

The support member 140 has a central opening 146 aligned with the opening 44 in the container 40 along the axis A. The opening 146 in the support member 140 is cylindrical and has a center located along the axis A. The opening 146 in the support member 140 has a diameter D5 (FIG. 2), measured in a direction normal to the axis A. The diameter D5 of the opening 146 in the support member 140 is substantially equal to the diameter D1 of the opening 44 in the container 40, so the opening in the support member is aligned coaxially with the opening 44 in the container 40. Thus, the area through which the inflation fluid can flow is the same for the opening 44 in the container 40 and the opening 146 in the support member.

The support member 140 has at least a portion 144, such as an outer cylindrical surface, which is made from a material that deforms when subjected to a predetermined force, such as a copper alloy. Preferably all of the support member 100 is made from the deformable material. The portion 144 of the support member 140 is deformed radially outward in a swaging operation during assembly of the container 40. The portion 144 is deformed into engagement with the inner cylindrical surface 122 of the cavity 120. The portion 144 of the support member 140 is also deformed radially outward beyond the cylindrical surface 122 of the cavity 120 and into the channel 126. The portion 144 of the support member 140 which is deformed radially outward into the channel 126 preferably fills the entire channel.

The support member 140 is thus held in the cavity 120 and against the major side surface 104 of the closure 100 by being deformed against the inner cylindrical surface 122 and into the channel 126. The support member 140 is also held in engagement with the end surface 124 of the cavity 120. The support member holds the closure 100 in the recess 82 and the major side surface 102 of the closure against the support surface 84 of the recess. The support member 140 thus holds the annular portion 106 of the closure 100 against the support surface 84 of the recess 82 and bears the majority of the load resulting from the pressure of the inflation fluid in the chamber 42 acting on the closure. The heat affected areas of the closure 100 are supported by the surface 142 of the support member 140 to assure that no heat affected area is directly exposed to the pressure of the inflation fluid which acts on the closure.

An actuatable igniter 160 (FIGS. 1 and 2) is supported by the tubular mounting 68 of the diffuser 60. The igniter 160 is located outside of the chamber 42 and along the axis A. An end 162 of the igniter 160 is located near the closure 100. The igniter 160 is actuated to produce combustion products, including a pressure wave and hot particles. The combustion products are directed at the closure 100 to rupture the closure.

The igniter 160 is electrically connected to the circuit 26 (FIG. 1). The circuit 26 communicates electrical power to the igniter 160 to actuate the igniter. A normally open sensor switch 164 in the circuit 26 senses a condition of a vehicle in which the protection system 20 is installed, such as a collision of the vehicle for which inflation of the air bag 22 is desired. The sensor switch 164 closes to conduct power from a power supply 166 in the circuit 26 to the igniter 160 for actuating the igniter.

Upon actuation of the igniter 160, the closure 100 ruptures to unblock the opening 44. Inflation fluid then flows from the chamber 42 through the opening 44 in the container 40 and the opening 146 in the support member 140 to inflate the air bag 22.

Figure 3:
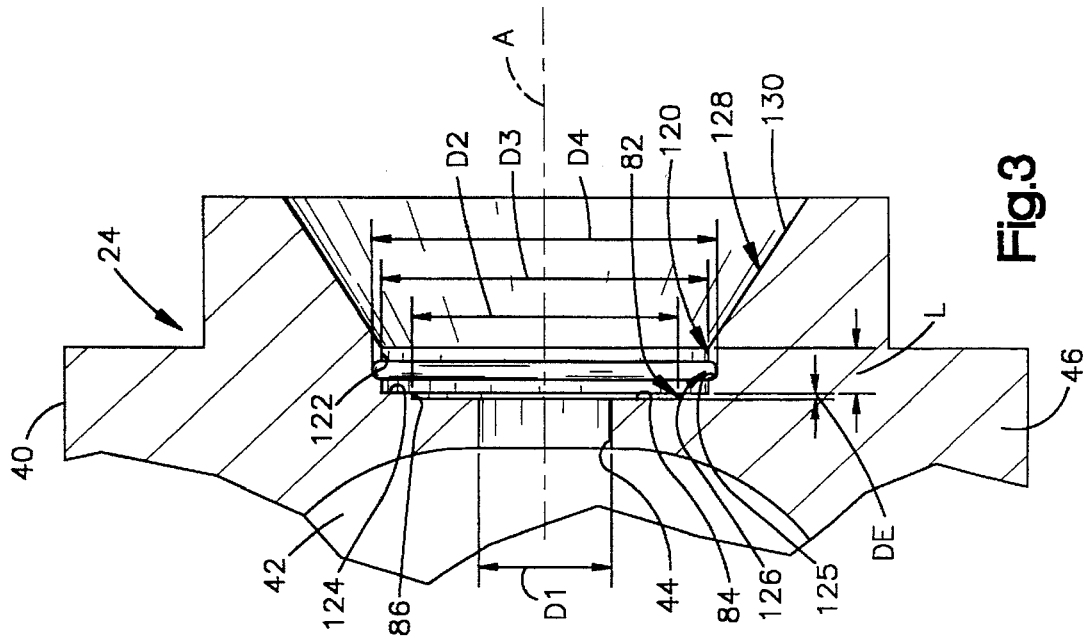

The method of assembling the inflator 24 includes providing the container 40. As illustrated in FIG. 3, the container 40 includes the opening 44 through which the inflation fluid can flow to inflate the air bag 22. The container 40 also includes the recess 82 which is defined in part by the support surface 84. The recess 82 is located adjacent to the opening 44 in the container 40. The container 40 also includes the cavity 120 which is defined in part by the inner cylindrical surface 122 and the end surface 124. The cavity 120 is located adjacent to the recess 82 on a side of the recess opposite the opening 44. The channel 126 extends outward from the inner cylindrical surface 122 of the cavity 120.

The closure 100 is positioned in the recess 82, as illustrated in FIG. 4. The annular portion 106 of the closure 100 engages the support surface 84 of the recess 82. The closure 100 is then laser welded to the support surface 84 at the continuous weld 108 around the opening 44, as illustrated in FIG. 5. The container 40, closure 100 and weld 108 thus cooperate to define the closed chamber 42 for inflation fluid.

Figure 6:
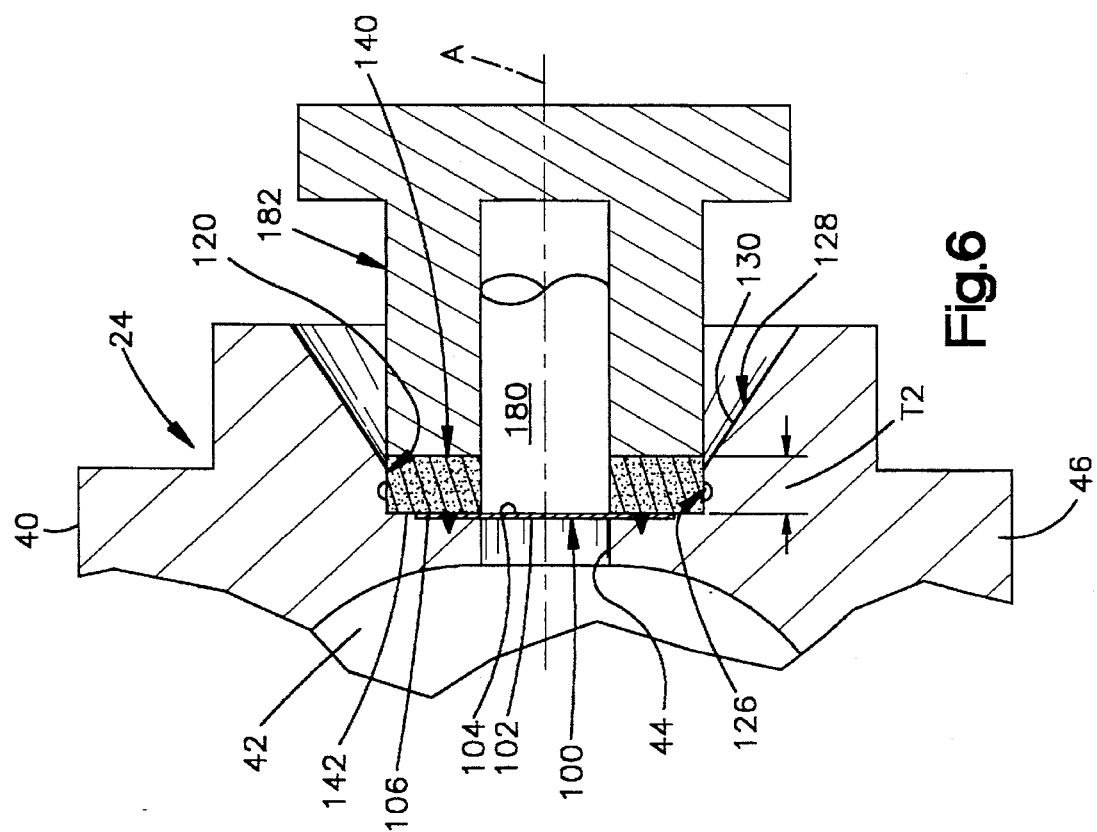

The annular support member 140 is then placed on an end of a mandrel 180, as illustrated in FIG. 6. The opening 146 of the support member 140 closely fits over the mandrel 180. The support member 140 fits within the cavity 120. The support member 140 has a thickness T2, measured in a direction parallel to the axis A, prior to being deformed. The mandrel 180 and the support member 140 are advanced together into the alignment chamber 128 along the axis A of the container 40. If the support member 140 is not aligned with the inner cylindrical surface 122 of the cavity 120 in a direction transverse to the axis A, the angled surface 130 of the alignment chamber 128 aligns and guides the support member during movement of the support member and mandrel 180 in a direction to the left, as viewed in FIG. 6. The end surface 142 of the support member 140 is brought into engagement with the end surface 124 of the cavity 120 and into engagement with the major side surface 104 of the closure 100.

Figure 7:
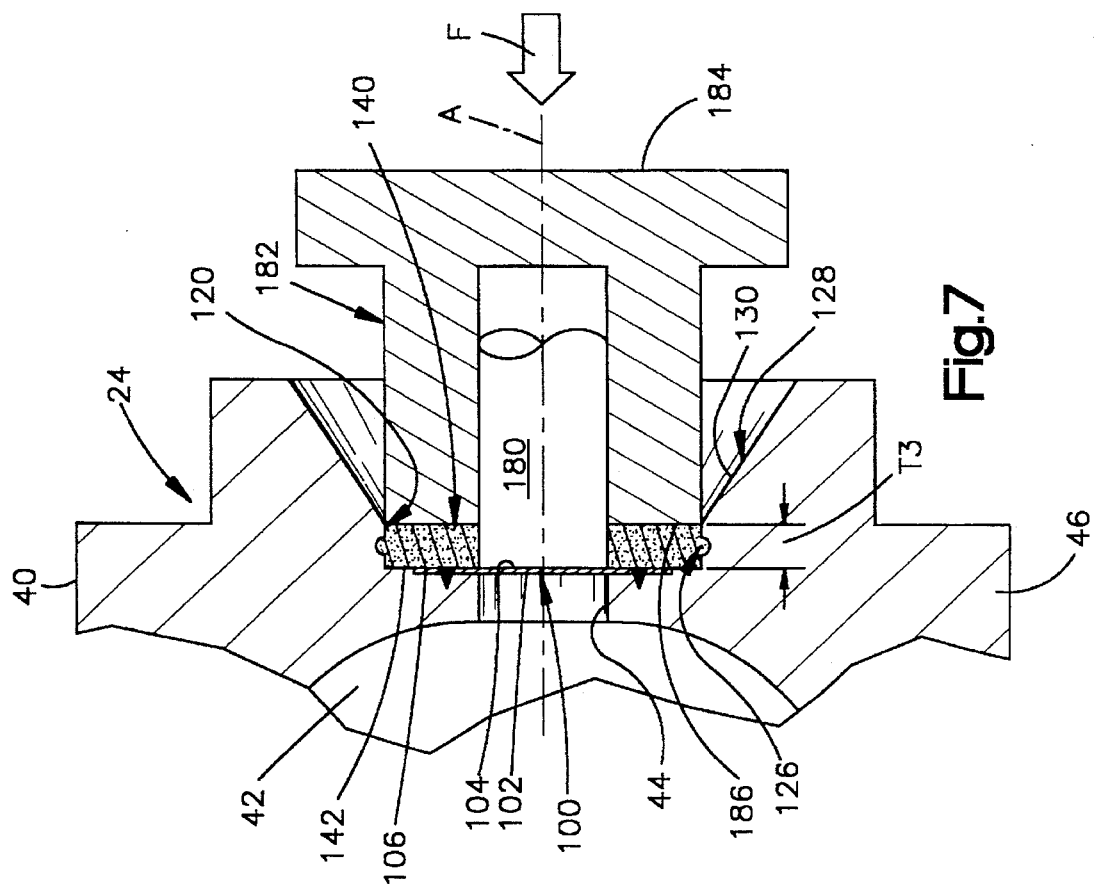

A swage tool 182 is then moved axially over the mandrel 180 and into engagement with the support member 140. As illustrated in FIG. 7, a force F is applied to a right end 184 of the swage tool 182. A left end 186 of the swage tool 182 engages the support member 140. The force F applied to the right end 184 of the swage tool 182 is transmitted to the support member 140 through the left end 186 of the swage tool. The portion 144 of the support member 140 is deformed and the material of the support member flows radially outward against the inner cylindrical surface 122 and into the channel 126.

The portion 144 of the support member 140 is deformed into engagement with surfaces of the cavity 120 and into the channel 126 to retain the support member in the cavity 120 and in engagement with the closure 100. The support member 140 has a thickness T3, after deformation, which is less than the predeformation thickness T2. The support member 140 holds the closure 100 in position against the support surface 84 to block flow through the opening 44 and bear the load of the inflation fluid in the chamber 42 acting on the closure. The mandrel 180 is made from a relatively hard and rigid metal to minimize deformation of the support member 140 radially inward.

Inflation fluid is introduced into the chamber 42 through the fill port 48 at a desired pressure. The fill port 48 is then sealed by the spherical member 52 during a welding operation. The swaging operation is preferably performed after the closure 100 is welded to the support surface 84 of the container 40 but prior to filling the chamber 42 with inflation fluid.

From the above description of the invention, those skilled in the art will perceive improvements, changes and modifications. Although the preferred embodiment of the invention describes the inflation fluid as being stored under pressure from the time the container 40 is filled, the inflation fluid could be stored at a pressure below the pressure at which the closure 100 ruptures. At the time inflation of the air bag 22 is desired, the pressure of the inflation fluid could be increased by heating the inflation fluid. The heat could be provided by an ignitable material in the container 40. The pressure of the inflation fluid could then be allowed to increase until it exceeded the rupture pressure of the closure 100. Therefore, the igniter 160 could be eliminated. Such improvements, changes and modifications within the skill of the art are intended to be covered by the appended claims.

Having described the invention, the following is claimed:

1. An apparatus comprising:

an inflatable vehicle occupant protection device;

a one-piece container providing a source of inflation fluid, said container having an opening though which fluid flows from the container to inflate the protection device and a support surface located on the exterior of said container adjacent to and around the opening in said container;

means for connecting said container in fluid communication with said protection device;

surface means for defining a cavity on the exterior of said container adjacent said support surface;

a rupturable closure on the exterior of said container extending across the opening to block the flow of fluid from said container through the opening;

a weld forming a fluid seal between said closure and said support surface of said container; and a member located in the cavity and having a first portion engaging said surface means defining the cavity to secure said member to said container and a second portion engaging said closure to hold said closure against said support surface of said container, said member having an opening aligned with the opening in said container through which fluid can flow when said closure is ruptured.

2. The apparatus of claim 1 wherein said surface means defining the cavity surrounds the opening in said container.

3. The apparatus of claim 1 wherein said member is annular and wherein said surface means defining the cavity comprises a cylindrical surface and a surface defining a channel extending from said cylindrical surface, said first portion of said member being deformed into engagement with said cylindrical surface and into the channel to hold said member in the cavity and to maintain said member in engagement with said closure.

4. The apparatus of claim 1 further including an actuatble igniter for, upon actuation, effecting the rupture of said closure.

5. The apparatus of claim 4 wherein said igniter is located outside of said container.

6. The apparatus of claim 1 wherein the flow area of the opening in said container is substantially equal to the flow area of the opening in said member, the opening in said container and the opening in said member being circular and concentric.

7. The apparatus of claim 1 wherein said weld creates a heat affected area on said closure and said second portion of said member clamps the heat affected area of said closure against said support surface and pressure of the inflation fluid in said container acts on the closure at a location other than the heat affected area.

\* \* \* \* \*